United States Patent [19]

Marianeschi et al.

[11] 4,213,792

[45] Jul. 22, 1980

[54] COATING SOLUTION FOR APPLYING TENSIONING COATINGS TO ELECTRICAL STEEL STRIP

[75] Inventors: Edmondo Marianeschi, Terni; Paolo Marini, Rome, both of Italy

[73] Assignees: Centro Sperimentale Metallurgico S.p.A.; Terni-Societe per l'Industria e l'Elettricita S.p.A., both of Rome, Italy

[21] Appl. No.: 880,983

[22] Filed: Feb. 24, 1978

[30] Foreign Application Priority Data

Mar. 9, 1977 [IT] Italy ............................ 48382 A/77

[51] Int. Cl.[2] ............................ C09K 3/00; C23F 7/08

[52] U.S. Cl. ............................ 106/286.6; 148/6.15 R; 148/6.16

[58] Field of Search ...................... 106/286, 74, 286.6; 148/6.15, 6.2, 6.15 Z, 6.16

[56] References Cited

U.S. PATENT DOCUMENTS

| | | | |
|---|---|---|---|
| 3,121,038 | 2/1964 | Perotte | 148/6.15 R |
| 3,214,302 | 10/1965 | Brodt et al. | 148/6.15 R |
| 3,248,249 | 4/1966 | Collins | 106/286 |

OTHER PUBLICATIONS

Chem. Abst. 63:7975d, 1965.

*Primary Examiner*—Theodore Morris
*Attorney, Agent, or Firm*—Young & Thompson

[57] ABSTRACT

A coating solution for forming on electrical steel strips an electrical insulation coating for tensioning the strip, contains on a dry weight basis for every 100 parts by weight of phosphoric acid, calculated as $P_2O_5$, from 10 to 35 parts by weight of $Ca^{2+}$ ions, calculated as CaO, from 70 to 200 parts by dry weight of colloidal $SiO_2$, and from 40 to 200 parts by weight of water for every 100 parts of $P_2O_5$. The solution may also contain up to 20 parts by weight of $Mg^{2+}$ calculated as MgO, up to 30 parts by weight of $Cr^{6+}$ calculated as $CrO_3$, and/or up to 30 extra parts by weight of phosphoric acid calculated as $P_2O_5$. The density of the solution is from 1.25 to 1.35 g/cc, and the value of the molar ratio $R=(CaO+MgO)/(P_2O_5+CrO_3)$ is from 0.7 to 0.9.

1 Claim, No Drawings

COATING SOLUTION FOR APPLYING TENSIONING COATINGS TO ELECTRICAL STEEL STRIP

The present invention relates to a coating solution for electrical steels, and more particularly to a solution for forming a non-conductive coating characterized by: (i) a smooth vitreous surface and satisfactory hardness; and (ii) a capacity to (a) maintain the underlying steel in a tensioned condition, and (b) improve the magnetic properties of the steel when the coating is applied to the surface of the steel in a continuous thin layer.

In the following specification, the nature of the invention is exemplified with reference to a particular steel, i.e. a mono-oriented silicon steel with Miller indices (110) [001]. However, the terms "steel", "electrical steel" and "electrical steel strip" which are used both in the specification and in the claims shall be understood to cover all iron alloys, and the strips obtained from them, that are employed in manufacturing electric transformers, electric motors and other similar apparatus for the production or the transformation of electric power, the said strips having a grain structure which is either randomly oriented or with varying degrees and types of preferred orientation.

It is a well-known fact that the manufacturing processes of electrical steel strip foresee the use of a coating during the final annealing treatment. The purpose of this coating (commonly known as the annealing separator) is (a) to prevent the individual layers of the coil from sticking together, and (b) to facilitate the elimination of certain elements from the strip (e.g. sulfur, aluminum, nitrogen) which downgrade the magnetic properties of the finished product.

In addition to the above-mentioned functions, annealing separators with magnesium oxide base (e.g. those described in our copending application Ser. No. 824,611, filed Aug. 15, 1977, the disclosure of which is incorporated herein by reference) form a thin layer which adheres closely to the surface of the strip and which is commonly called "glass film" or "mill glass" by metallurgists. Experience has shown that this thin layer, which despite its name does not appear to have a glass morphology or to be at any rate an entirely vitreous material, can to some extent improve certain properties of the steel strip. Efforts have therefore been made to encourage its formation and to increase its beneficial effects on the properties of the finished product. It has been ascertained, however, that there are limits to the improvements which can be obtained by means of this type of glass film; for example, there is no substantial increase in either interlaminar resistivity or tensioning power.

New types of coating have therefore been developed with phosphoric acid as the basic component. These types in the majority of cases are applied by deposition from solutions or aqueous suspensions. As a result, increasingly complex separating agents have been introduced consisting of coating solutions composed initially of phosphoric acid and metal phosphates with the optional addition of magnesium oxide (U.S. Pat. No. 2,501,846), subsequently of phosphoric acid and aluminum hydroxide (U.S. Pat No. 2,743,203) and finally of a basic mixture of phosphoric acid, hexavalent chromium compounds and boric acid with the optional addition of components such as: magnesium oxide, calcium oxide, zinc oxide, silica and sodium silicate (U.S. Pat. No. 3,207,636).

The discovery that certain properties of some types of magnetic steel strip could be improved by subjecting the strip to mechanical tension contributed notably to the advancement of technical knowledge in this particular field and to the manufacture of magnetic steel strips with progressively higher performance characteristics. U.S. Pat. No. 3,528,863 is a direct consequence of this discovery. In this patent, the magnetic steel strip is coated with a composition which forms a glass with a low coefficient of thermal expansion. When melted onto the surface of the strip, the glass adheres strongly to the surface and, in cooling, subjects the underlying steel strip to mechanical tension. The glass used in this patent is prepared separately beforehand, finely ground and suspended in water; and it is then deposited onto the strip.

Numerous other patents could be mentioned, all of which are based on the same principle; for example:

- Japanese Pat. No. 74006742, covering a solution of phosphoric acid, chromic acid, silica gel and alumina;
- German Application No. 2,247,269, covering a solution of aluminum phosphate, hexavalent chromium compounds and silica gel;
- Japanese Pat. No. 49046542, covering a solution of phosphoric acid, chromic anhydride, magnesium compounds and calcium silicate;
- Belgian Pat. No. 821,596, covering a solution of silica gel, phosphoric acid, magnesium oxide and chromates; and
- U.S. Pat. No. 3,948,786, covering a coating solution which includes $Al^{3+}$ and $Mg^{2+}$ ions and the radical $H_2PO_4^-$ with the optional addition of silica gel and chromic anhydride (this invention would appear to combine the teachings of the Belgian patent and the German application cited above).

A review of these patents, and of other existing patents and publications the details of which have been omitted for reasons of brevity, shows that the final coating of a magnetic steel strip should be vitreous, hard and with a low coefficient of thermal expansion; in addition, the coating should: (i) possess sufficient compressive strength to keep the underlying steel strip in a tensioned condition; (ii) be sufficiently thin to ensure a satisfactory space factor (i.e. a high packing density); (iii) have a high surface resistivity so as to reduce eddy-current losses.

We have conducted a wide range of investigations into the properties of the final non-conductive linings applied to these strips. During the course of these investigations, which were undertaken so as to obtain the best possible performance according to the guidelines listed above, a number of surprising results emerged which led to the definition of the present invention.

The purpose of this invention is to provide a coating bath composition for magnetic steel strips which: (i) can be easily and economically prepared; (ii) is highly stable; (iii) will produce a coating having high performance and (above all) invariable characteristics.

The invention has the additional object of providing an insulating coating suitable for application to high-quality silicon steel strip coated with "mill glass" produced by the special annealing separators (whose basic component is a mixture of rare earth oxides) described in our above-identified application.

A review of existing technical literature and of non-conductive linings at present available on the market reveals that one of the most important properties of the coating (i.e. resistivity) undergoes at times substantial degradation after the stress-relieving treatment.

This invention has therefore also the object of providing a coating whose insulation resistance will remain unimpaired by stress-relieving treatment, or at the most will undergo only negligible variations.

The present invention is based on the discovery that, when calcium oxide is an essential component of the coating bath solution, a glass film can be obtained with an insulation resistance which is practically unaltered by the stress-relieving treatment. Surprisingly enough, it was also noted that, despite the presence of calcium oxide in the solution, the tensioning effect of this type of coating could be improved substantially, thereby reducing magnetostriction and magnetic losses. It is in fact well known that the magnetic properties of steel strip improve when the strip is subjected to mechanical tension. As mentioned previously, the strip is maintained in a stressed condition by virtreous coatings with an extremely low coefficient of thermal expansion (viz. for example U.S. Pat. No. 3,528,863); on the other hand, according to glass technology, calcium is a component which has a negative effect on the coefficient of thermal expansion of glass.

In the light of the above, we experimented with calcium additions solely in order to verify their influence on the resistivity of the glass film. One can well understand, therefore, the surprise which accompanied the finding that the linings produced according to this invention were capable of producing a strong tensioning effect on the underlying steel strip, improving the latter's magnetic properties and reducing magnetic losses.

According to the present invention, the insulative coating is obtained by dipping the steel strip into a bath containing an aqueous solution of a calcium compound in phosphoric acid, to which silica gel is added. The relative concentrations of the phosphorus, calcium and silica ions contained in the bath must be kept within well-established limits, as will be explained in fuller detail later.

It was also found that the concentration of the bath can be advantageously adjusted, according to the type of equipment used for depositing the solution on the steel strip and for obtaining the desired vitreous layer by heat treatment; this variation in concentration can be obtained by increasing the amount of phosphoric acid present in the solution or by adding chromic acid (in both cases the outcome is the possibility to increase calcium content), or again by adding a magnesium compound which is more soluble than the calcium compound used.

These variations of composition have interesting side-effects. Within certain limits, an excess of phosphoric acid improves the finish of the coating, making it smoother and more reflective. The same result can be obtained using chromic acid which, in addition, increases the wetting capacity of the coating solution and produces a more hydrophobic coating. The addition of magnesium compounds improves the quality and evenness of the coating.

In point of fact, the present invention permits the formation of improved coatings for magnetic steel strips by dipping the strip in an aqueous bath whose composition (in terms of dry weight) may vary within the following limits:

$H_3PO_4$ as $P_2O_5$: 100 parts by weight
$Ca^{2+}$ as CaO: 10–35 parts by weight
$SiO_2$ as silica gel: 70–200 parts by weight.

Water is added to these components in the proportion of 40–200 parts by weight for every 100 parts by weight of $P_2O_5$; this amount includes the water content of the phosphoric acid and of the silica gel.

As has already been mentioned, the following additions can be made to the above solution (in terms of dry weight): (i) up to 20 parts by weight of $Mg^{2+}$ as MgO; (ii) up to 30 parts by weight of $Cr^{6+}$ as $CrO_3$; (iii) extra amounts of phosphoric acid up to 30 parts by weight as $P_2O_5$.

To be more exact, the proportions in which the various components are present in the solution must be such as to ensure that the value of the molar ratio $$R=(CaO+MgO)/(P_2O_5+CrO_3)$$

remains between 0.7 and 0.9.

In fact, for $R<0.7$, the insulating capacity of the lining drops substantially after the stress-relieving treatment and the lining assumes a non-uniform texture and a powdery aspect. For $R>0.9$ the bath has a tendency to gel and to precipitate components to a greater or lesser degree depending on the density value, which in turn depends on the type of equipment used for depositing the solution; furthermore, the lining acquires a dull finish, weak adhesive properties and non-uniform texture.

EXAMPLE

Several coating baths were prepared, the solid compositions of which are listed in Table 1. In addition, an equal weight of water was added to make up each bath. Industrial products were used exclusively for preparing the baths; the silica gel was of the acid stabilized type with a 30% content of $SiO_2$ in suspension and the phosphoric acid was 75% proof.

The steel strips used were produced industrially and were coated with a glass film obtained according to our above-identified application and whose composition was 6% by weight rare earth oxides in the proportions $CeO_2$: about 50%, $La_2O_3$: about 30%, Nd and Pr and other rare earth oxides: about 20%; balance essentially MgO. All the strips used were obtained from the same steel casting and were treated with the process described in U.S. Pat. No. 3,959,033.

After coating, the strips were subjected to a standard drying and baking treatment, namely, heating at 800° C. for 30 seconds.

Test samples were taken from each of the coated strips and marked to identify the upper and lower face of the strip. Two series of test pieces were then cut from each test sample, i.e.: (i) a series of Epstein test pieces which were used for measuring permeability and magnetic loss values; and (ii) a separate series of test pieces for measuring Franklin resistivity, packing density, magnetostriction, adhesion and stretching power or tensioning effect on the substrate. The test pieces were all subjected to the standard stress-relieving treatment of heating at 830° C. for 60 seconds. The steel strips used for the tests had magnetization values ranging from 1.90 to 1.92 Tesla at 800 amps/m.

Packing density values were higher than 97% for all test pieces examined. The magnetostriction curves obtained for Test Solutions 2 and 7 were comparable to those shown in our above-identified application and revealed not only low peak magnetostriction values ($0.3$-$0.4$, $10^{-6}$), but also limited variations of the peak values over the entire magnetization range up to 1.9 Tesla.

TABLE 1

| Test Solution | Composition (% by weight) | | | | |
|---|---|---|---|---|---|
| | $P_2O_5$ | CaO | $SiO_2$ | MgO | $CrO_3$ |
| 1 | 35.2 | 9.4 | 49.0 | — | 6.4 |
| 2 | 28.5 | 6.2 | 55.5 | 3.6 | 6.2 |
| 3 | 30.3 | 11.9 | 52.8 | — | 5.0 |
| 4 | 34.3 | 8.0 | 49.8 | 3.2 | 4.7 |
| 5 | 34.3 | 3.5 | 50.6 | 7.0 | 4.6 |
| 6 | 35.5 | 8.1 | 53.7 | 2.7 | — |
| 7 | 31.5 | 8.4 | 52.4 | 3.2 | 4.5 |
| 8 | 30.2 | 6.2 | 55.7 | 4.8 | 3.1 |

The results of the other tests are listed in Table 2. The figures shown in this Table are average values, except in the case of Franklin resistivity; the results of the latter test (ASTM A 344-60T standard) are instead given as the percent distribution of the measured value over the resistivity range from 0 to 1000 $\Omega/cm^2$. For comparison purposes Table 2 also includes the corresponding most significant values extracted from some of the patents cited above (U.S. Pat. No. 3,948,786; German Application No. 2,247,269, Belgian Pat. No. 821,596).

most suitable for depositing on magnetic steel strips films which are nonconductive and, at the same time, capable of maintaining the strip in a tensioned condition.

Steel strips coated with baths prepared according to this invention acquire far higher overall performance characteristics. Very important advantages, in fact, can be obtained by combining the values shown for magnetic loss, magnetostriction and insulation resistance (Franklin resistivity. Let us consider, for example, the case of an electric transformer: given the high specific stress values (kg/$mm^2$ per micron of coating thickness), the thickness of the coating can be reduced without increasing magnetization loss and magnetostriction to any great extent and without impairing interlaminar insulation resistance. Under these conditions the space factor will be increased and the overall volume of the transformer core reduced without any reduction of the power output; additional cost savings are possible since the number of copper windings of the transformer can also be reduced. Conversely, if a high specific stress value is the critical requirement of the laminations, transformer losses will be considerably lower even if packing density values are adopted which are typical of other well-known types of insulation coating.

TABLE 2

| Test No. | R | Present distribution of Franklin resistivity values ($\Omega/cm^2$) after stress relieving treatment | | | | Magnetization Loss w/kg. W 17/50 | Specific Stress kg $mm^{-2}$ 82 $^{-1}$ | Adhesion, Bending Radius mm |
|---|---|---|---|---|---|---|---|---|
| | | 0-39.9 | 4-99.9 | 100-999.9 | 1000 $+\Omega/cm^2$ | | | |
| 1 | 0.53 | 34.6 | 65.4 | — | — | 1.20 | 0.05 | 20 |
| 2 | 0.77 | 4 | 88.3 | 7.2 | 0.5 | 1.12 | 0.09 | 15 |
| 3 | 0.81 | — | 15.0 | 27.5 | 57.5 | 1.08 | 0.14 | 10 |
| 4 | 0.84 | — | 12.5 | 17.5 | 70.0 | 1.07 | 0.15 | 10 |
| 5 | 0.83 | — | 14.3 | 19.6 | 66.1 | 1.06 | 0.16 | 10 |
| 6 | 0.85 | 0.7 | 17.5 | 25.0 | 56.8 | 1.08 | 0.14 | 15 |
| 7 | 0.88 | — | 28.2 | 25.0 | 46.8 | 1.07 | 0.13 | 15 |
| 8 | 1.00 | 21.6 | 74.4 | 4.0 | — | 1.18 | 0.04 | 20 |
| U.S. Patent | — | The best value indicated (0.065 Amp) corresponds to approximately 90 $\Omega/cm^2$ | | | | 1.09 | — | — |
| German Appln. | — | ←resto→ | | 83.3 | — | 1.046 | — | — |
| Belgian Patent | — | — | — | — | — | 1.14 | — | 15 |

The result of the tensioning power tests performed on the coatings obtained according to the present invention are given as specific stress values, i.e. kg/$mm^2$ per micron of lining thickness.

Adhesion test were carried out by bending Epstein-type test pieces 180° around cylinders with progressively descreasing diameters; the number shown in the Table indicates in millimeters the diameter at which macroscopic cracks appeared on the test-piece. Obviously, the smaller the diameter the greater the adhesion of the coating.

No appreciable differences were noted between measurements carried out on the upper and on the lower faces of the test-pieces.

Finally, Franklin resistivity values measured before stress relieving treatment are not shown, since all tests gave results which were very close to the peak values (i.e. around 1000 $\Omega/cm^2$).

Scanning electron microscope analysis revealed that coatings obtained with the present invention have an extremely smooth and even surface finish, whereas those obtained with other well-known compositions have an uneven powderly aspect and show pitting which often exposes the underlying steel strip.

The results given in Table 2 prove that coating solutions prepared according to the present invention are Two additional advantages should also not be overlooked. In the first place, the low magnetostriction values permit a considerable reduction in transformer noise; in the second place, the notable uniformity of the coating thickness ensures a highly reliable interlaminar insulation which permits the adoption of space factor values very close to unity.

What we claim is:

1. Coating solution for forming on electrical steel strips an electrical insulation coating having a low coefficient of thermal expansion, containing on a dry weight basis for every 100 parts by weight of phosphoric acid, calculated at $P_2O_5$, from 10 to 35 parts by weight of $Ca^{2+}$ ions, calculated as CaO, up to 30 parts by weight of $Cr^{6+}$ ions, calculated as $CrO_3$, an effective amount up to 20 parts by weight of $Mg^{2+}$ ions, calculated as MgO, said amount being effective to improve the quality and evenness of the coating as compared to a coating lacking said amount, from 70 to 200 parts by dry weight of colloidal $SiO_2$, the value of the molar ratio $$R=(CaO+MgO)/(P_2O_5+CrO_3)$$

being from 0.7 to 0.9, and from 40 to 200 parts by weight of water for every 100 parts of $P_2O_5$.

* * * * *